United States Patent
Sendhilnathan et al.

(10) Patent No.: US 12,125,126 B1
(45) Date of Patent: Oct. 22, 2024

(54) MANAGING VISUAL CLUTTER IN ARTIFICIAL REALITY ENVIRONMENTS

(71) Applicant: Meta Platforms Technologies, LLC, Menlo Park, CA (US)

(72) Inventors: Naveen Sendhilnathan, Seattle, WA (US); Ting Zhang, Santa Clara, CA (US); Sebastian Freitag, Seattle, WA (US); Tanya Renee Jonker, Seattle, WA (US); Peiqi Tang, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/492,413

(22) Filed: Oct. 23, 2023

(51) Int. Cl.
*G06T 11/00* (2006.01)
*G06F 3/01* (2006.01)
*G06V 20/20* (2022.01)

(52) U.S. Cl.
CPC .............. *G06T 11/00* (2013.01); *G06F 3/013* (2013.01); *G06V 20/20* (2022.01); *G06T 2200/24* (2013.01)

(58) Field of Classification Search
CPC .......... G06F 3/011; G06F 3/013; G06F 1/163; G06F 3/04842; G06F 3/04815; G06F 3/0482; G02B 27/0093; G02B 27/017; G06N 20/00; G06T 11/00; G06V 20/20
See application file for complete search history.

(56) References Cited

U.S. PATENT DOCUMENTS

| | | | |
|---|---|---|---|
| 10,867,181 B2 | 12/2020 | Singh | |
| 2018/0130224 A1* | 5/2018 | Hoelscher | G06T 7/70 |
| 2018/0267603 A1* | 9/2018 | Bastian | G06V 40/18 |
| 2022/0221981 A1 | 7/2022 | Lee et al. | |
| 2022/0236795 A1 | 7/2022 | Jonker et al. | |
| 2023/0274468 A1* | 8/2023 | Kaur | G06T 7/0004 |
| | | | 345/619 |

OTHER PUBLICATIONS

Abidin; et al., "Adaptive Multimodal Interaction in Mobile Augmented Reality: A Conceptual Framework," AIP Conference Proceedings, Oct. 3, 2017, vol. 1891, No. 01, 8 pages.
(Continued)

*Primary Examiner* — Robin J Mishler
(74) *Attorney, Agent, or Firm* — McDermott Will & Emery LLP

(57) ABSTRACT

In particular embodiments, a computing system may receive an image comprising one or more virtual elements associated with a virtual environment and one or more real-world elements associated with a real-world environment. The system may determine a first metric and a second metric indicative of a measure of clutter in the virtual environment and the real-world environment, respectively. The system may determine gaze features associated with a user based on a user activity and predict, using a machine learning model, a reaction time of the user based on the gaze features. The system may determine a third metric indicative of the measure of clutter in the image based on predicted reaction time. The system may compute an overall clutter metric based on the first, second, and third metrics. The system may perform one or more actions to manage the clutter in the image based on the overall clutter metric.

20 Claims, 6 Drawing Sheets

(56) References Cited

OTHER PUBLICATIONS

Flittner; et al., "Predicting User Performance in Augmented Reality User Interfaces with Image Analysis Algorithms," Proceedings of the Human Factors and Ergonomics Society Annual Meeting, Feb. 9, 2021, vol. 64, No. 01, pp. 2108-2112.

Moacdieh; et al., "Using Eye Tracking to Detect the Effects of Clutter on Visual Search in Real Time," IEEE Transactions on Human-Machine Systems, Dec. 2017, vol. 47, No. 06, 7 pages, Retrieved from the Internet: URL: https://ieeexplore.ieee.org/document/7936583.

Rosenholtz; et al., "Feature Congestion: A Measure of Display Clutter," CHI '05: Proceedings of the SIGCHI Conference on Human Factors in Computing Systems, Apr. 2, 2005, pp. 761-770, Retrieved from the Internet: URL: https://dl.acm.org/doi/pdf/10.1145/1054972.1055078.

Rosenholtz; et al., "Measuring Visual Clutter," Journal of Vision, Aug. 6, 2007, vol. 07, No. 02, 22 pages, Retrieved from the Internet: URL: https://jov.arvojournals.org/article.aspx?articleid=2122001.

Rotman; et al., "Clutter Metrics for Target Detection Systems," IEEE Transactions on Aerospace and Electronic Systems, Jan. 1994, vol. 30, No. 01, pp. 81-91, Retrieved from the Internet: URL: https://ieeexplore.ieee.org/document/250408.

* cited by examiner

MANAGING VISUAL CLUTTER IN ARTIFICIAL REALITY ENVIRONMENTS

TECHNICAL FIELD

This disclosure generally relates to computer graphics and clutter management. In particular, the disclosure relates to adaptively managing visual clutter in artificial reality environments, such as mixed reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content, such as a mixed reality image, may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

"Passthrough" is a feature that allows a user to see their physical surroundings while wearing an artificial reality system, such as, for example, a mixed reality (MR) headset. Information about the user's physical environment is visually "passed through" to the user by having the MR headset display information captured by the headset's external-facing cameras.

A mixed reality image or a user interface (UI) that is displayed to a user wearing the artificial reality system (e.g., MR headset) may include (1) a passthrough image that is representative of the user's physical or real-world environment and (2) one or more virtual elements (e.g., digital avatars, VR/AR applications, AR objects, etc.) overlaid on top of the passthrough image of the real world. While interacting with such a mixed reality image or UI, the user is assumed to pay their full intention to the interface. In some instances, the UI presented to the user may be cluttered and not properly organized. For example, there may be numerous applications open at the same time including unnecessary applications, overwhelming number of interactable options within an application, several notifications, etc. Such a cluttered image or UI presented to the user may pose a safety concern to the user especially when roaming in the real-world environment. Also, computing resources may be unnecessarily wasted in displaying elements that are not even of interest to the user (e.g., since the user is not focusing on these elements in their UI).

As such, there is a need to perform visual clutter management to adaptively manage a cluttered UI or mixed reality image such that the user is not overwhelmed with information (e.g., visual content) while they are engaged in an artificial reality environment, such as a mixed reality environment involving virtual and real-world interactions.

SUMMARY OF PARTICULAR EMBODIMENTS

Particular embodiments described herein relates to a system and a method for adaptively managing visual clutter in an artificial reality environment, such as a mixed reality environment. The clutter management discussed herein may be performed for a visual scene presented by an artificial reality system, such as a mixed reality headset. The visual scene may be a mixed reality image, which may be composed of (1) a real-world environment consisting of one or more real world elements (e.g., cars, trees, people, roads, etc.) and (2) a virtual reality environment (or a virtual environment) consisting of one or more virtual elements (e.g., applications on artificial reality system, digital avatar (s), AR/VR objects, etc.). The one or more virtual elements may be overlaid on top of the real-world elements. As discussed elsewhere herein, if the visual scene presented to a user is significantly cluttered (e.g., too many virtual elements, too dense/crowded physical environment), then that may disrupt the user experience. Simply managing clutter based on a measure of virtual clutter and/or real-world clutter using existing image analysis methods would not necessarily take into account the amount of clutter that the user is experiencing at a given time. For instance, different users may perceive images differently. By way of an example, a first user may perceive the visual scene differently from a second user. This may be due to the fact that different users react differently to their environments and therefore, have different reaction times to the same information presented to them. As such, the perceptual nature of the user or a user component should also be made part of process when evaluating how cluttered a particular environment is, whether there is an actual need to manage the visual clutter as per the user's perception, and how much to modify content (e.g., elements in virtual UI) to manage the visual clutter.

In particular embodiments, a system and a method for clutter management may adaptively and intelligently perform the clutter evaluation and management using three components. These components include a virtual user interface (UI) component, a real-world component, and a user component. A separate clutter metric may be computed for each of the virtual UI component, the real-world component, and the user component. Each clutter metric may be indicative of a measure of clutter in their respective component. For instance, a first clutter metric may be indicative of a measure of virtual UI clutter (e.g., how cluttered the virtual UI is based on a number of virtual elements (e.g., VR/AR applications) present therein). A second clutter metric may be indicative of a measure of real-world clutter (e.g., how cluttered the real-world environment is based on a number of real-world elements (e.g., physical objects) present therein). In particular embodiments, the first clutter metric indicative of the measure of virtual UI clutter and the second clutter metric indicative of the measure of real-world clutter may be computed using one or more image analysis techniques, such as, for example, a feature congestion technique, a subband entropy technique, or an edge density technique.

In particular embodiments, a third clutter metric may be computed based on a third component, which is the user component. As discussed earlier, simply managing clutter based on a measure of virtual UI clutter and/or real-world clutter using image analysis methods would not necessarily take into account the amount of clutter that the user is experiencing at a given time and the perceptual nature of the user. For instance, different users may perceive and respond to images differently. Stated differently, one user may be able to respond to an element in an image more quickly than another user. This reaction time of the user may be the key to determine or evaluate how cluttered a particular environment is. Reaction time is one of the best physiological correlates of visual clutter. Increased visual clutter causes increased cognitive, visual, memory, motor load, or a combination of them. This leads to increased reaction time. In particular embodiments, the reaction time may be determined based on a plurality of gaze features (e.g., saccade velocity, saccade duration, length of saccade, fixation point, fixation duration, scanpath rate, etc.) associated with the user when performing a certain task.

In particular embodiments, a machine learning (ML) model may be trained to predict a reaction time in real time based on a plurality of gaze features that are provided as input to the ML model. The ML model is trained based on a wide variety of user trials or studies performed in diverse environments, including no clutter environments, low clutter environments, medium clutter environments, and high clutter environments. For each user trial, gaze features are observed when performing a given task and reaction time of the user is recorded to perform the given task. Based on the gaze features and reaction times associated with the different user trials or studies, the ML model is built to predict a reaction time in real time for a given mixed reality environment.

At inference time, gaze features are determined while a user is viewing a mixed reality image and the trained ML model is used to predict a reaction time based on the gaze features. The reaction time output by the ML model may indicate a time that the user may take to respond to a certain task in a given mixed reality environment, including the virtual UI clutter and the real-world clutter. Based on the reaction time, a third clutter metric may be computed. The third clutter metric may be indicative of a measure of clutter in the mixed reality environment or a fused image, including the virtual UI clutter and the real-world clutter. Once the first clutter metric based on the virtual UI clutter, the second clutter metric based on the real-world clutter, and the third clutter metric based on the reaction time are determined, the system discussed herein may calculate an overall clutter metric. The overall clutter metric may be a true indication of visual clutter in the user's environment (e.g., mixed reality environment) according to the user's perception and whether there is a need to manage the clutter in order to the improve user's viewing experience, better manage computing resources, make better use of display space, etc.

Based on the overall clutter metric, the system discussed herein may perform one or more actions to manage the clutter in the visual scene or image presented to the user via the artificial reality system. In particular embodiments, the one or more actions may be performed responsive to determining that the overall clutter metric is above a certain threshold value. By way of an example, the overall clutter metric may be a value between 0 and 1 and the predetermined threshold may be 0.75, and if the value of the overall clutter metric is above 0.75, the one or more actions are performed. In particular embodiments, the one or more actions for clutter management may include, for example and without limitation, closing one or more applications from the virtual UI, changing a layout of the user's current display, adjusting a size (e.g., increase, decrease) of one or more elements in the virtual UI, modifying information (e.g., expanding or contracting information) associated with one or more applications in the virtual UI, changing positions of the one or more applications in the virtual UI, etc.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A mixed reality image or a user interface (UI) that is displayed to a user wearing an artificial reality system (e.g., artificial reality system 400) may include (1) a passthrough image that is representative of the user's physical or real-world environment and (2) one or more virtual elements (e.g., digital avatars, VR/AR applications, AR objects, etc.) overlaid on top of the passthrough image of the real world. While interacting with such a mixed reality image or UI, the user is assumed to pay their full intention to the interface. In some instances, the mixed reality image may be highly cluttered and not properly organized. For example, there may be numerous applications open at the same time including unnecessary applications, overwhelming number of interactable options within an application, several notifications, etc. Such a cluttered image or UI presented to the user may pose a safety concern to the user especially when roaming in the real-world environment. Also, computing resources may be unnecessarily wasted in displaying elements that are not even of interest to the user (e.g., since the user is not focusing on these elements in their UI). As such, there is a need to adaptively perform clutter management to better manage a cluttered UI or mixed reality image such that the user is not overwhelmed with information (e.g., visual content) while they are engaged in an artificial reality environment, such as a mixed reality environment involving virtual and real-world interactions.

Figure 1:
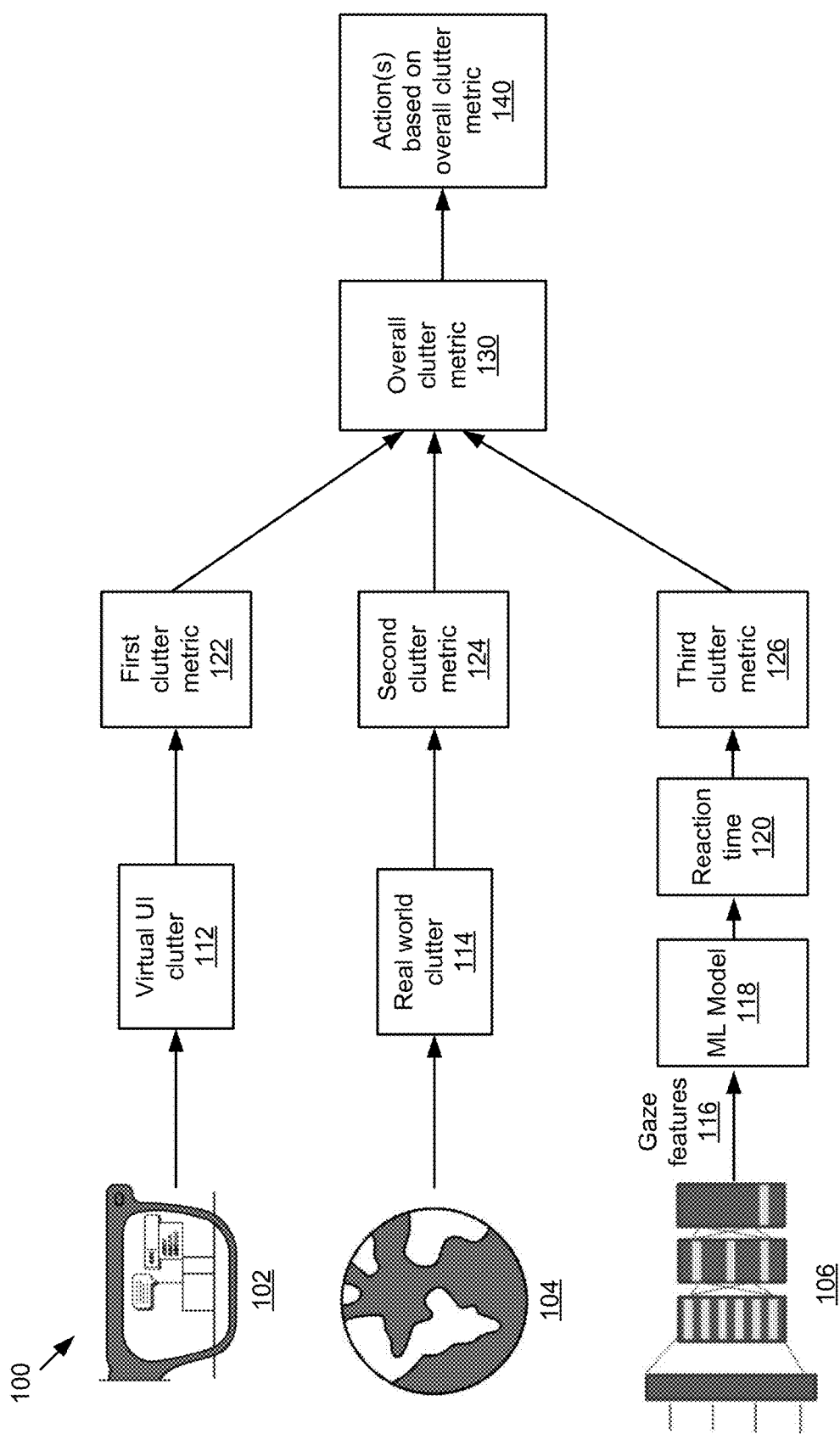
FIG. 1 illustrates a block diagram of computing an overall clutter metric for adaptively managing clutter in an artificial reality environment.

FIG. 1 illustrates a block diagram 100 of computing an overall clutter metric for adaptively managing clutter in an artificial reality environment. The clutter management discussed herein may be performed for a visual scene presented by an artificial reality system, such as artificial reality system 400 shown in FIG. 4. For instance, the visual scene may be a mixed reality visual scene, which may be composed of a real-world environment consisting of one or more real world elements (e.g., cars, trees, people, roads, etc.) and a virtual reality environment (or a virtual environment) consisting of one or more virtual elements (e.g., applications on artificial reality system, digital avatar(s), AR/VR objects, etc.). The one or more virtual elements may be overlaid on top of the real-world elements. As discussed elsewhere herein, if the visual scene presented to a user is significantly cluttered (e.g., too many virtual elements, too dense/crowded physical environment), then that may disrupt the user experience. Simply managing clutter based on a measure of virtual clutter and/or real-world clutter using existing image analysis methods would not necessarily take into account the amount of clutter that the user is experiencing at a given time. For instance, different users may perceive images differently. By way of an example, a first user may perceive the visual scene differently from a second user. More specifically, the first user may perceive the visual scene presented to them as cluttered, whereas the second user may perceive the visual scene as not that cluttered. This may be due to the fact that different users react differently to their environments and therefore, have different reaction times to the same information presented to them. As such, the perceptual nature of the user or a user component should also be made part of process when evaluating how cluttered a particular environment is.

In particular embodiments, a system (e.g., computer unit 408 of artificial reality system 400 or computer system 600) may adaptively and intelligently perform the clutter evaluation and management using three components. As depicted in FIG. 1, these components include a virtual user interface (UI) component 102, a real-world component 104, and a user component 106. In particular embodiments, the virtual UI component 102 and the real-world component 104 may be obtained by decomposing a captured visual scene or an image, which may be captured using an artificial reality system. By way of an example, the image may be captured using external cameras 405A and 405B of the artificial reality system 400 shown in FIG. 4. As mentioned earlier, the image may a mixed reality image, which may include one or more virtual elements associated with a virtual environment and one or more real-world elements associated with a real-world environment, where the one or more virtual elements may be overlaid on top of the one or more real-world elements. Such a mixed reality image may be decomposed into two separate image layers, including a virtual layer corresponding to the virtual UI component 102 and a real-world layer corresponding to the real-world component 104. Each of the virtual and real-world layers may be analyzed using one or more image analysis techniques to separately evaluate a measure of clutter in the virtual environment and the real-world environment, as discussed in further detail below.

In particular embodiments, one or more image analysis techniques or methods may be applied on the virtual layer corresponding to the virtual UI component 102 to evaluate virtual UI clutter 112 in a virtual reality environment or space. More specifically, the one or more image analysis techniques may be used to evaluate a measure of clutter in the UI of the virtual environment presented to the user. The UI of the virtual environment or the virtual UI may be composed of one or more virtual elements, such as, for example and without limitations, applications installed on the artificial reality system, digital avatar(s), AR/VR objects, etc. Stated differently, the virtual UI clutter 112 may represent all the virtual and/or augmented reality applications present on a user's display screen. An image analysis technique or method, as discussed in further detail below, may be used to analyze the virtual layer or an image representative of the UI of the virtual environment and determine the virtual UI clutter 112 and a first clutter metric 122 indicative of a measure of clutter in the virtual environment. More specifically, the image analysis technique may analyze the virtual layer to determine how cluttered the virtual UI is based on a number of virtual elements (e.g., VR/AR applications) present therein.

The one or more image analysis techniques discussed herein may include, for example and without limitation, a feature congestion technique, a subband entropy technique, or an edge density technique. The feature congestion technique is based on various features in an image. Basically, the feature congestion technique considers all possible features, such as, for example, contrast, shape, size, color, etc., and take each feature into consideration towards measurement of the clutter, such as the virtual UI clutter 112. By way of an example, if there is a cluttered desk and you want to search for a specific element (e.g., keychain) on the desk, then how long it will take for you to find that element is the basis behind feature congestion. Subband entropy technique is based on the idea of how well an image can be compressed by super serving details in the image perceptually or in other words, how well can you do an image compression. So, if the image is highly cluttered then it may not be compressed well because significant details will be lost. Whereas if the image is less cluttered, then it may be compressed well without losing details. The edge density technique may include calculating proportion of edges to one or more objects within a scene. So, if there are more objects, there will be more edges. Calculating number of pixels at the edges (e.g., edge pixels) divided by the total number of pixels may give a measure of clutter, such as the virtual UI clutter 112.

Based on the virtual UI clutter 112 determined using the one or more image analysis techniques, a first clutter metric 122 may be computed that is indicative of a measure of clutter in the virtual environment. In particular embodiments, the first clutter metric 122 may be a normalized value between 0 and 1, where 0 is indicative of a no clutter environment and 1 is indicative of a highly cluttered environment. By way of an example and without limitation, the first clutter metric may be 0 if there are no applications present in the virtual UI, the first clutter metric may be 0.5 if there are 2-3 applications present in the virtual UI, and the first clutter metric may be 1 if there are beyond a certain number of applications present in the virtual UI, such as 10 applications.

In particular embodiments, similar to how the one or more image analysis techniques are applied on the virtual layer corresponding to the virtual UI component 102 to evaluate the virtual UI clutter 112 and the first clutter metric 122, the one or more image analysis techniques may be applied to a real-world layer corresponding to the real-world component 104 to evaluate real-world clutter 114 and a second clutter metric 124. More specifically, the one or more image analysis techniques may be used to evaluate a measure of clutter in the real-world environment presented to the user. The real-world environment may be composed of one or more real-world elements that may be present in the user's physical environment, such as, for example and without limitations, cars, trees, people, buildings, roads, etc. Stated differently, the real-world clutter 114 may represent how dense or crowded the user's physical environment is. An image analysis technique or method, as discussed elsewhere herein, may be used to analyze the real-world layer or an image representative of the real-world environment and determine the real-world clutter 114 and a second clutter metric 124 indicative of a measure of clutter in the real-world environment. More specifically, the image analysis technique may analyze the real-world layer to determine how cluttered the real-world environment is based on a number of real-world elements present therein.

Once the real-world clutter 114 is analyzed, the second clutter metric 124 may be computed that is indicative of a measure of clutter in the real-world environment. In particular embodiments, the second clutter metric 124, similar to the first clutter metric 122, may be a normalized value between 0 and 1, where 0 is indicative of a no clutter environment and 1 is indicative of a highly cluttered environment. By way of an example and without limitation, the first clutter metric may be 0 if a user is staring at a blank wall or a blank screen and the first clutter metric may be 0.8 if the user is walking in Times Square, New York on New Year's Eve.

In particular embodiments, a third clutter metric 126 may be computed based on a third component, which is the user component 106. As discussed earlier, simply managing clutter based on a measure of virtual UI clutter 112 and/or real-world clutter 114 using image analysis methods would not necessarily take into account the amount of clutter that the user is experiencing at a given time. For instance, different users may perceive and respond to images differently. Stated differently, one user may be able to respond to an element in an image more quickly than another user. This reaction time of the user to an element may be the key to determine or evaluate how cluttered a particular environment is. In particular embodiments, the reaction time 120 may be determined based on a plurality of gaze features (e.g., gaze features 116) associated with the user when performing a certain task and a machine learning (ML) model 118 may be trained to predict the reaction time 120 based on the gaze features 116 that are provided as input to the ML model 118.

In order to determine the gaze features 116, a mixed reality image, including virtual UI element(s) (e.g., AR/VR apps) and real-world element(s) (e.g., buildings, cars, trees, etc.), is provided to a user wearing an artificial reality system (e.g., artificial reality system 400) and while viewing the mixed reality image, the user may perform a certain task. The task may include searching for a specific element in the mixed reality image. As an example, the mixed reality image may include an image of the Golden Gate Bridge and surrounding environment that the user may be viewing through their mixed reality headset (e.g., artificial reality system 400) and there may be 5 applications overlaid on top of this image, including a music app, a gaming app, a video app, a messaging app, and an image capture app, and the user while looking at this mixed reality image may look for a stop button in the music app to stop the music. As another example in the same mixed reality image, the user may have received a notification that a message has been received and the user may look for the messaging app in the mixed reality image to read the received message. While the user is performing the task (e.g., looking for a stop button in the music app or looking for the messaging app), eye tracking sensor(s) of the artificial reality system worn by the user may track the user's eye or gaze movements while the user is performing the task. Based on the tracked user's eye or gaze movements, a plurality of gaze features 116 may be determined. In particular embodiments, the plurality of gaze features 116 may include, for example and without limitation, gaze or saccade duration (e.g., how long was the user's gaze when looking for a specific element), saccade/gaze velocity (e.g., speed of user's gaze when moving from one point to another to look for the specific element), fixation duration (e.g., how long the user fixate at a particular point), fixation point (e.g., where the user's eye fixated), saccade altitude, angular velocity of saccade, saccade probability, length of saccade (e.g., distance travelled by user's eyes from one point to another), probability of fixation or fixation probability, scanpath rate, etc.

Once the gaze features 116 are determined, the gaze features 116 may be provided as inputs to the ML model 118, which is trained to predict a reaction time 120 of the user to respond to a certain task (e.g., searching for a specific element in a mixed reality image) based on the gaze features 116. In particular embodiments, the ML model 118 is trained based on a wide variety of user trials or studies performed in diverse environments, including no clutter environment, low clutter mixed-reality environment, medium clutter mixed-reality environment, and high clutter mixed-reality environment. For each user trial, a plurality of gaze features is observed when performing a given task and reaction time of the user is recorded to perform the given task. Based on the gaze features and reaction times associated with the different user trials or studies, the ML model 118 is built to predict a reaction time in real time for a given mixed-reality environment. Model architectures such as logistic regression or deep learning models (e.g., temporal convolutional network (TCN), recurrent neural network (RNN)) could be good candidates for the ML model discussed herein. Training of the ML model 118 is discussed in detail below in reference to FIG. 2.

In particular embodiments, the reaction time 120 output by the ML model 118 may indicate a time that the user may take to respond to a certain task in the given mixed reality environment, including the virtual UI clutter 112 and the real-world clutter 114. Based on the reaction time 120, a third clutter metric 126 may be determined. The third clutter metric 126 may be indicative of a measure of clutter in the mixed reality environment or a fused image, including the virtual UI clutter 112 and the real-world clutter 114. In particular embodiments, similar to the first clutter metric 122 and the second clutter metric 124, the third clutter metric 126 may also be a normalized value between 0 and 1, where 0 is indicative of a no clutter environment and 1 is indicative of a highly cluttered environment. However, the third clutter metric 126 here is based on the reaction time 120 and the value of the third clutter metric 126 may vary based on how much low or high the reaction time 120 is. Stated differently, the value of the third clutter metric 126 may be proportional to the reaction time 120. For instance, if the reaction time 120 is low, then the third clutter metric 126 will be low, which may be indicative of a low cluttered environment. Whereas if the reaction time 120 is high, then the third clutter metric 126 will be high, which may be indicative of a highly cluttered environment. By way of an example and without limitation, if it took 5 seconds for the user to pause music in the music app by selecting the stop button, then the third clutter metric 126 may be 0.3 which may be indicative of a low clutter environment. Whereas if it took 30 seconds for the user to perform the same action, then the third clutter metric 126 may be 0.8, which may be indicative of a high clutter environment.

Once the first clutter metric 122 based on the virtual UI clutter 112, the second clutter metric 124 based on the real-world clutter 114, and the third clutter metric 126 based on the reaction time 120 are determined, the system (e.g., computer unit 408 of artificial reality system 400 or computer system 600) may calculate an overall clutter metric 130. The overall clutter metric 130 may be a true indication of visual clutter in the user's environment (e.g., mixed reality environment) according to the user's perception and whether there is a need to manage the clutter in order to the improve user's viewing experience, better manage computing resources, make better use of display space, etc.

In particular embodiments, the overall clutter metric 130 may be computed based on weighting the first clutter metric 122, the second clutter metric 124, and the third clutter metric 126, and then taking a weighted sum of the three metrics. In some embodiments, equal weights may be assigned to the three metrics 122, 124, 126 and the overall clutter metric 130 may be computed by simply taking an average of the three metrics. In other embodiments, different weights may be assigned to the three metrics 122, 124, 126 and the overall clutter metric 130 may be computed by taking a sum of the three metrics according to their weights. For example, equal weightage may be applied to the first and second clutter metrics 122 and 124, but a relatively higher weightage may be applied to the third clutter metric 126.

Once the overall clutter metric 130 is computed, the computing system discussed herein may perform one or more actions 140 to manage the clutter in the visual scene or image presented to the user via the artificial reality system, such as the artificial reality system 400. In particular embodiments, the one or more actions 140 may be performed responsive to determining that the overall clutter metric 130 is above a certain threshold value. For instance, the computing system may compare the overall clutter metric 130 to a predetermined threshold, determine whether the overall clutter metric 130 is above or below the predetermined threshold, and perform the one or more actions 140 if the overall clutter metric 130 is determined to be above the predetermined threshold. By way of an example, the overall clutter metric 130 may be a value between 0-1 and the predetermined threshold may be 0.75, and if the value of the overall clutter metric 130 is above 0.75, then the one or more actions 140 are performed. In particular embodiments, the one or more actions for clutter management may include, for example and without limitation, closing one or more applications from the virtual UI, changing a layout of the user's current display, adjusting a size (e.g., increase, decrease) of one or more elements in the virtual UI, modifying information (e.g., expanding or contracting information) associated with one or more applications in the virtual UI, changing positions of the one or more applications in the virtual UI, etc.

Figure 2:
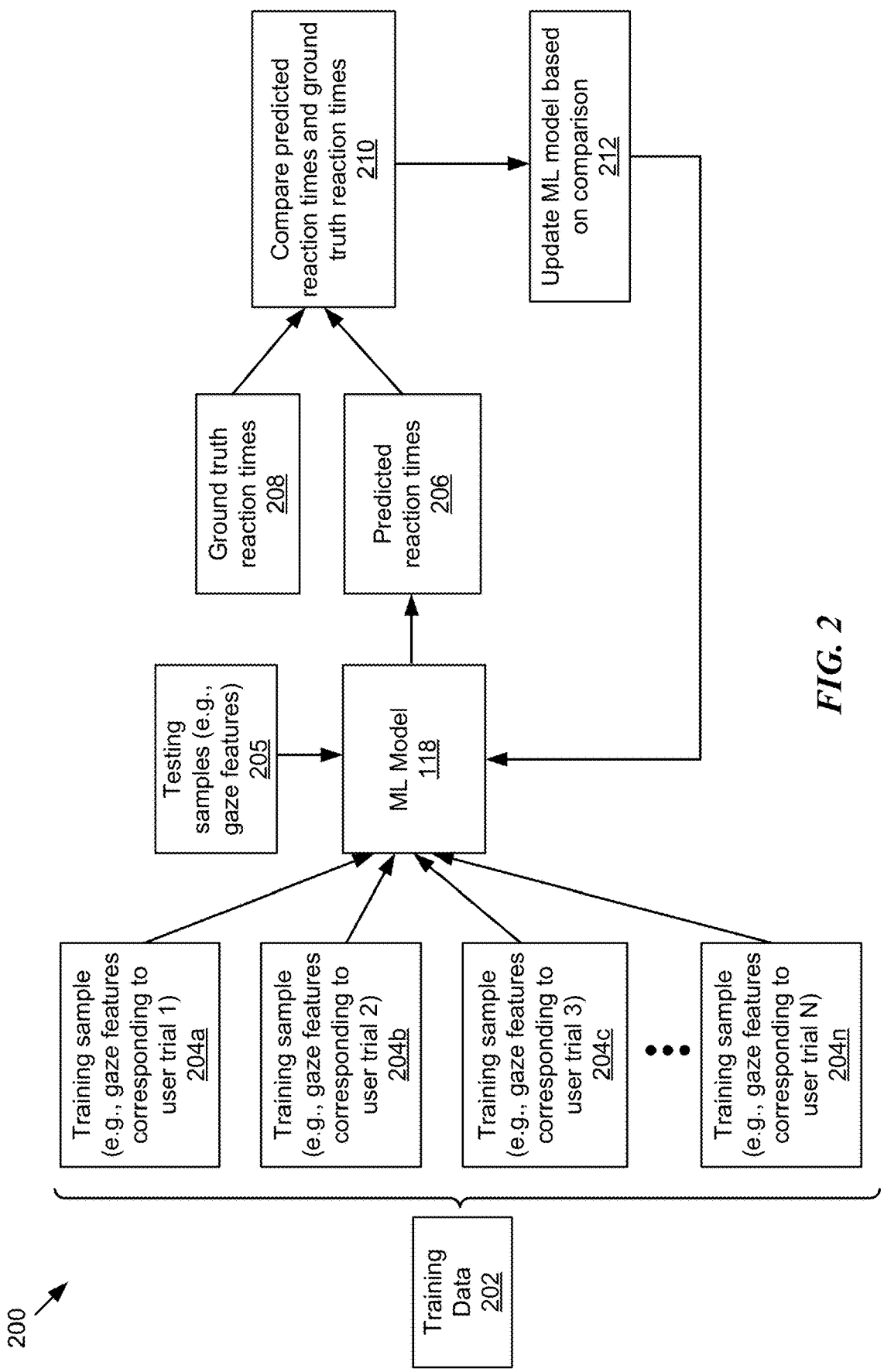
FIG. 2 illustrates an example training process for training a machine learning model to predict a reaction time of a user based on user's gaze features.

FIG. 2 illustrates an example training process 200 for training a machine learning model 118 to predict a reaction time of a user based on user's gaze features. As discussed above in reference to FIG. 1, a reaction time of a user may be used to evaluate how cluttered is a user's display image (e.g., mixed reality image displayed via mixed reality headset) and whether there is really a need to perform clutter management as per the user's perception. In particular embodiments, the ML model 118 may be trained to predict the reaction time in real time (i.e., inference time) based on a plurality of gaze features associated with the user. As depicted, the ML model 118 is trained using training data 202, which may include a plurality of training samples 204a, 204b, 204c, . . . , 204n (individually and/or collectively herein referred to as 204). By way of an example and without limitation, the ML model 118 may be trained based on 100 training samples, out of which 90 samples may be used for training the ML model 118 and 10 samples (e.g., testing samples 205) may be used for testing the ML model 118.

The plurality of training samples 204 may be obtained based on conducting a plurality of user trials or studies in different clutter scenarios, including no clutter environments, low clutter environments, medium clutter environments, and high clutter environments. Each training sample 204 correspond to a user trial and includes gaze features of a particular user, where the gaze features are observed for a specific duration (e.g., 30 seconds) during which the particular user performs an assigned task in a specific clutter scenario and a reaction time of the particular user to perform the assigned task is recorded. This recorded reaction time may serve as ground truth (e.g., ground truth reaction times 208) for testing the ML model 118, as discussed later below.

As discussed earlier, the training samples 204 for training the ML model 118 may include gaze features of users and their recorded reaction times (e.g., ground truth reaction times) for a plurality of user trials performed in different clutter scenarios or environments. For instance, training sample 204a includes gaze features corresponding to user trial 1 that may be performed in a clutter scenario 1 (e.g., low visual UI clutter and low real-world clutter), training sample 204b includes gaze features corresponding to user trial 2 that may be performed in a clutter scenario 2 (e.g., low visual UI clutter but high real-world clutter), training sample 204c includes gaze features corresponding to user trial 3 that may be performed in a clutter scenario 3 (e.g., high visual UI clutter but low real-world clutter), and training sample 204n includes gaze features corresponding to user trial N that may be performed in a clutter scenario N.

The ML model 118 is trained based on the plurality of training samples 204. Once the model 118 is trained based on a set number of training samples, the ML model 118 may be tested. In order to test the ML model 118, a set of testing samples 205 may be accessed. The testing samples 205 may be part of the training data 202. These testing samples 205 may include observed gaze features of users in different clutter scenarios. The testing samples 205 are provided as inputs to the ML model 118, which may then use the input gaze features to predict reaction times 206 of the users in the different clutter scenarios. Ground truth reaction times 208 (e.g., true or actual reaction times) of these users are accessed and then the predicted reaction times generated by the ML model 118 and the ground truth reaction times 208 are compared, as indicated by reference numeral 210. Based on the comparison, a loss function may be computed that is used to determine an error rate or metric (e.g., root-mean square error (RMSE) error or root-mean square deviation (RMSD)) between values of the predicted reaction times 206 by the ML model and the ground truth reaction times 208. Using the computed loss function and/or the comparison, the ML model 118 may be updated, as indicated by reference numeral 212. The ML model 118 may be updated to minimize the loss function.

In particular embodiments, updating the ML model 118 may include updating one or more parameters or components of the ML model 118. The training process 200 may be repeated until the loss function is minimized (e.g., RMSE is nearly zero or reach to a certain threshold value), all the training and testing samples have been utilized, and/or a predetermined number of training iterations have been performed. Once the ML model 118 is determined to be sufficiently trained, the trained ML model 118 may be used to predict reaction time of a user at inference time, as discussed, for example, in reference to at least FIG. 1. The trained ML model 118 may be stored in a memory of an artificial reality device, such as artificial reality system 400.

Figure 3:
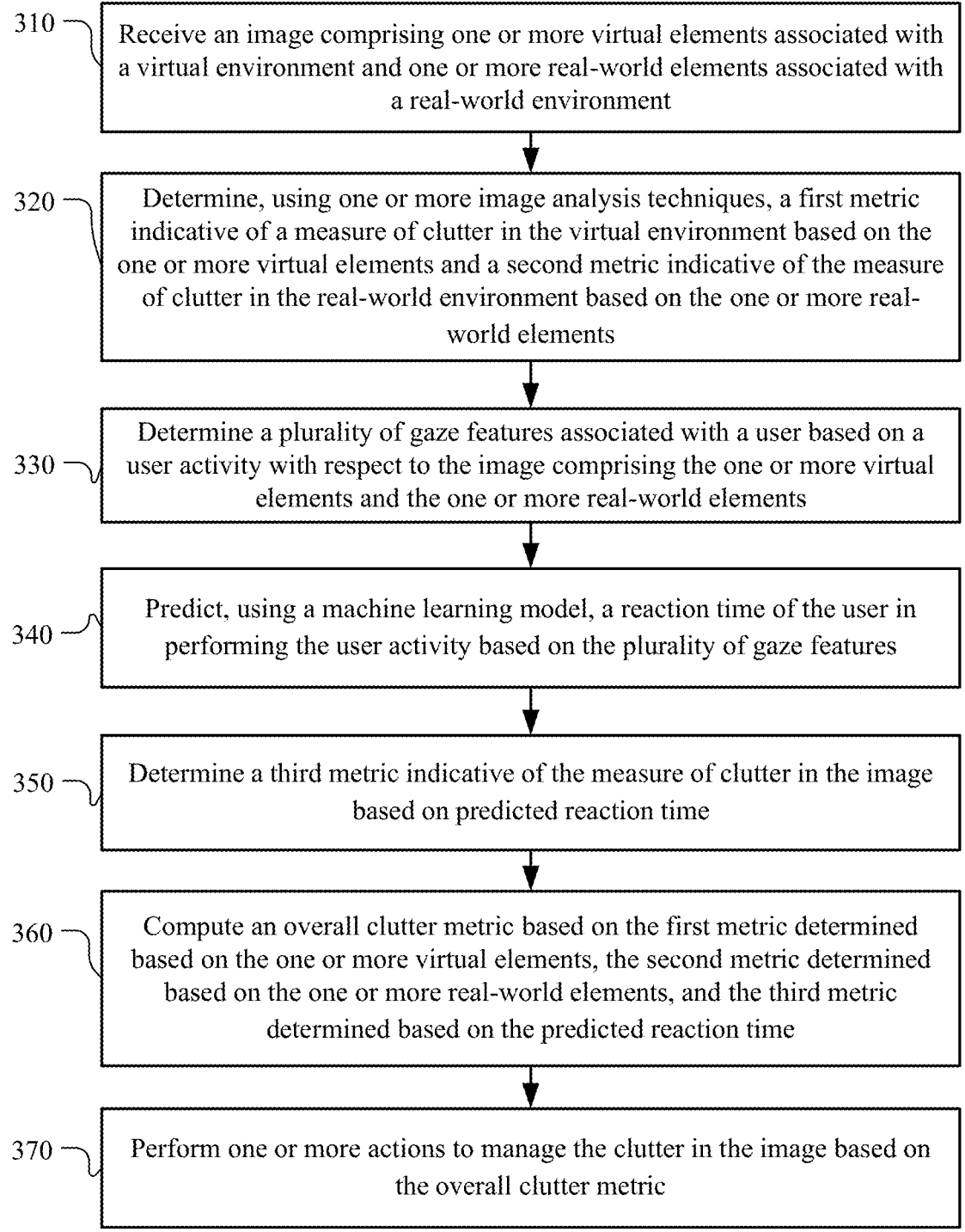
FIG. 3 illustrates an example method for adaptively managing visual clutter in an artificial reality environment, in accordance with particular embodiments.

FIG. 3 illustrates an example method 300 for adaptively managing visual clutter in an artificial reality environment, in accordance with particular embodiments. The method 300 may begin at step 310, where a computing system (e.g., the computer 408) associated with an artificial reality system (e.g., the artificial reality system 400) may receive an image comprising one or more virtual elements associated with a virtual environment and one or more real-world elements associated with a real-world environment. The image may be captured using external cameras 405A-405B of the artificial reality system 400 and the captured image may be a mixed reality image. In particular embodiments, the image may be decomposed into a virtual layer (or virtual UI component 102) comprising the one or more virtual elements associated with the virtual environment and a real-world layer (or real-world component 104) comprising the one or more real-world elements associated with the real-world environment. In some embodiments, the one or more virtual elements may include applications (e.g., AR/VR applications) installed on the artificial reality system and the one or more real-world elements may include physical objects (e.g., buildings, cars, people, trees, etc.) present in the real-world environment. The one or more virtual elements may be overlaid on top of the one or more real-world elements.

At step 320, the computing system (e.g., the computer 408 of the artificial reality system 400) may determine, using one or more image analysis techniques, a first metric (e.g., first clutter metric 122) indicative of a measure of clutter in the virtual environment (e.g., virtual UI clutter 112) based on the one or more virtual elements and a second metric (e.g., second clutter metric 124) indicative of the measure of clutter in the real-world environment (e.g., real-world clutter 114) based on the one or more real-world elements. In particular embodiments, the first metric (e.g., first clutter metric 122) indicative of the measure of clutter in the virtual environment may be determined by executing the one or more image analysis techniques or methods on a virtual layer corresponding to a virtual UI component, such as virtual UI component 102. The second metric (e.g., second clutter metric 124) indicative of the measure of clutter in the real-world environment may be determined by executing the one or more image analysis techniques on a real-world layer corresponding to a real-world component, such as real-world component 104. The one or more image analysis techniques may include, for example and without limitation, a feature congestion technique, a subband entropy technique, or an edge density technique.

At step 330, the computing system (e.g., the computer 408 of the artificial reality system 400) may determine a plurality of gaze features associated with a user based on a user activity with respect to the image comprising the one or more virtual elements and the one or more real-world elements. Determining the gaze features may be triggered in response to user performing some sort of activity. In some embodiments, the user activity may include the user searching for a particular virtual element (e.g., application) among the one or more virtual elements and the one or more real-world elements in the mixed reality image. Based on the user activity, the computing system may determine the plurality of gaze features. The plurality of gaze features may be tracked or collected using eye tracking sensors associated with the artificial reality system. In particular embodiments, the plurality of gaze features may include, for example and without limitation, gaze or saccade velocity, saccade probability, saccade altitude, fixation point, fixation duration, saccade duration, length of saccade, an angular velocity of saccade, etc.

At step 340, the computing system (e.g., the computer 408 of the artificial reality system 400) may predict, using a machine learning model (e.g., ML model 118), a reaction time of the user in performing the user activity based on the plurality of gaze features. In particular embodiments, the machine learning model may be trained by (1) accessing a plurality of training samples obtained based on conducting a plurality of user trials or studies in different clutter scenarios, where each training sample corresponds to a user trial and includes gaze features of a particular user observed for a specific duration during which the particular user performs an assigned task in a specific clutter scenario, (2) predicting, using the machine learning model, reaction times of users in the plurality of user trials based on the gaze features included in the plurality of training samples, (3) comparing the predicted reaction times with ground-truth reaction times, and (4) updating the machine learning model based on comparison.

At step 350, the computing system (e.g., the computer 408 of the artificial reality system 400) may determine a third metric (e.g., third clutter metric 126) indicative of the measure of clutter in the image based on predicted reaction time by the machine learning model. At step 360, the computing system may compute an overall clutter metric (e.g., overall clutter metric 130) based on the first metric determined based on the one or more virtual elements, the second metric determined based on the one or more real-world elements, and the third metric determined based on the predicted reaction time. In some embodiments, computing the overall clutter metric may include taking a weighted average of the first metric, the second metric, and the third metric according to weights assigned for each of the first, second, and third metrics.

At step 370, the computing system (e.g., the computer 408 of the artificial reality system 400) may perform one or more actions to manage the clutter in the image (e.g., mixed reality image) based on the overall clutter metric. In particular embodiments, performing the one or more actions may be based on a determination of whether the overall clutter metric is above or below a predetermined threshold. For instance, the computing system may compare the overall clutter metric to a predetermined threshold and determine that the overall clutter metric is above the predetermined threshold. Responsive to determining that the overall clutter metric is above the predetermined threshold, the computing system may perform the one or more actions for clutter management. The one or more actions to manage the clutter in a visual scene or an image may include, for example and without limitation, removing the one or more virtual elements from the image, modifying information associated with the one or more virtual elements, changing a layout or position of the one or more virtual elements in the image, adjusting a size of the one or more virtual elements, etc. If in case, the overall clutter metric is below the predetermined threshold, then no actions for clutter management may be performed and content (e.g., image or UI) presented to the user may stay as-is.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for adaptively managing visual clutter in an artificial reality environment, including the particular steps of the method of FIG. 3, this disclosure contemplates any suitable method for adaptively managing visual clutter in an artificial reality environment, including any suitable steps, which may include a subset of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
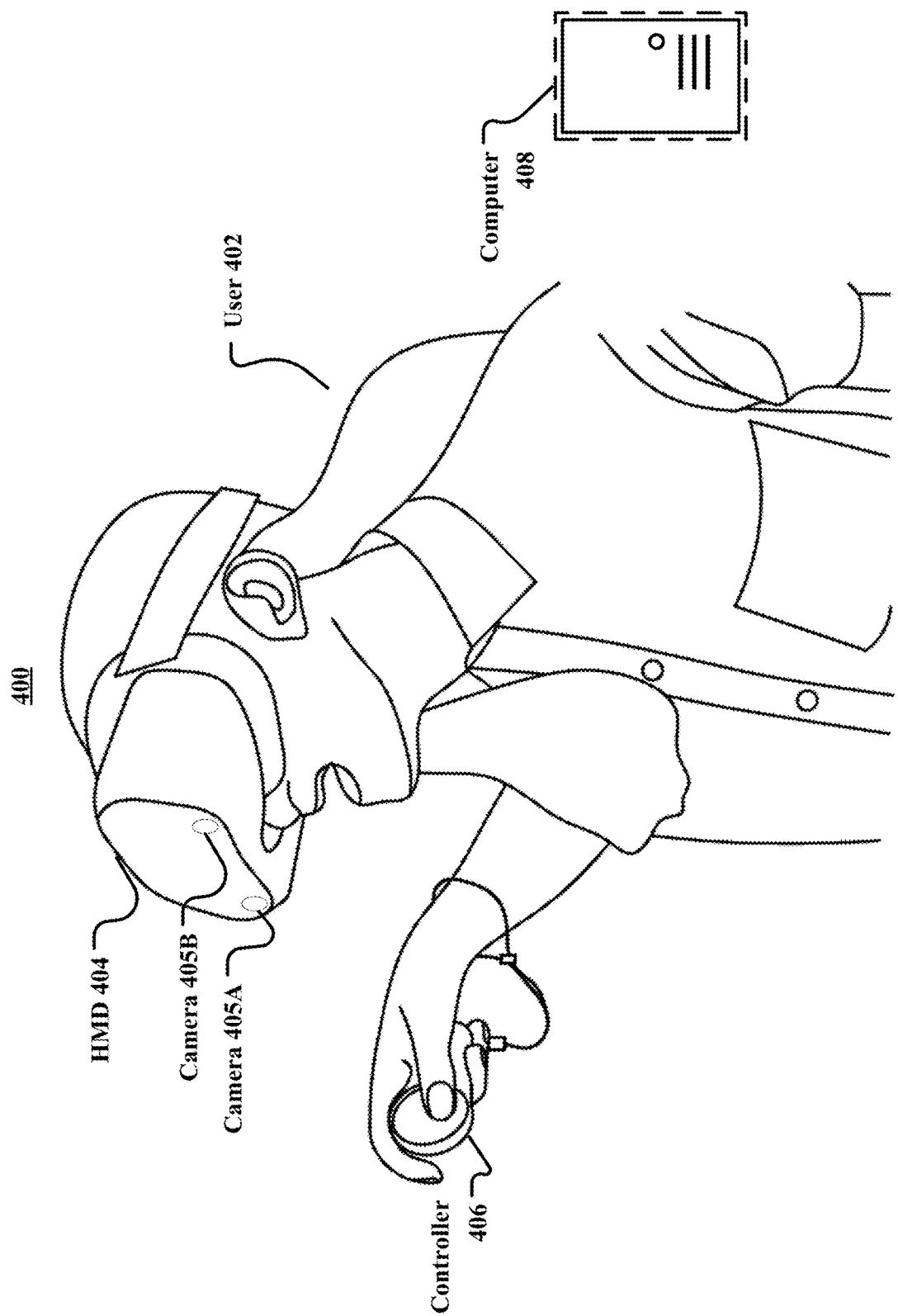
FIG. 4 illustrates an example of an artificial reality system worn by a user.

FIG. 4 illustrates an example of an artificial reality system 400 worn by a user 402. The artificial reality system 400 may be used to implement some of the embodiments/examples disclosed herein. The artificial reality system 400 may be configured to operate as a virtual reality display, an augmented reality display, and/or a mixed reality display. In particular embodiments, the artificial reality system 400 may comprise a head-mounted device ("HMD") 404, a controller 406, and a computing system 408. The HMD 404 may be worn over the user's eyes and provide visual content to the user 402 through internal displays (not shown). The HMD 404 may have two separate internal displays, one for each eye of the user 402. As illustrated in FIG. 4, the HMD 404 may completely cover the user's field of view. By being the exclusive provider of visual information to the user 402, the HMD 404 achieves the goal of providing an immersive artificial-reality experience. In particular embodiments, the HMD 404 may be configured to present a view of the user's surrounding or external physical environment as one or more passthrough images (e.g., user 402 while wearing the HMD 404 may still be able to see the outside physical environment).

The HMD 404 may have external-facing cameras, such as the two forward-facing cameras 405A and 405B shown in FIG. 4. While only two forward-facing cameras 405A-B are shown, the HMD 404 may have any number of cameras facing any direction (e.g., an upward-facing camera to capture the ceiling or room lighting, a downward-facing camera to capture the floor or a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 405A-B. Depth may be measured in a variety of ways. In particular embodiments, depth may be computed based on stereo images. For example, the two forward-facing cameras 405A-B may share an overlapping field of view and be configured to capture images simultaneously. As a result, the same physical object may be captured by both cameras 405A-B at the same time. For example, a particular feature of an object may appear at one pixel $p_A$ in the image captured by camera 405A, and the same feature may appear at another pixel $p_B$ in the image captured by camera 405B. As long as the depth measurement system knows that the two pixels correspond to the same feature, it could use triangulation techniques to compute the depth of the observed feature. For example, based on the camera 405A's position within a 3D space and the pixel location of $p_A$ relative to the camera 405A's field of view, a line could be projected from the camera 405A and through the pixel $p_A$. A similar line could be projected from the other camera 405B and through the pixel $p_B$. Since both pixels are supposed to correspond to the same physical feature, the two lines should intersect. The two intersecting lines and an imaginary line drawn between the two cameras 405A and 405B form a triangle, which could be used to compute the distance of the observed feature from either camera 405A or 405B or a point in space where the observed feature is located.

In particular embodiments, the pose (e.g., position and orientation) of the HMD 404 within the environment may be needed. For example, in order to render the appropriate display for the user 402 while he is moving about in a virtual environment, the system 400 would need to determine his position and orientation at any moment. Based on the pose of the HMD, the system 400 may further determine the viewpoint of either of the cameras 405A and 405B or either of the user's eyes. In particular embodiments, the HMD 404 may be equipped with inertial-measurement units ("IMU"). The data generated by the IMU, along with the stereo imagery captured by the external-facing cameras 405A-B, allow the system 400 to compute the pose of the HMD 404 using, for example, SLAM (simultaneous localization and mapping) or other suitable techniques.

In particular embodiments, the artificial reality system 400 may further have one or more controllers 406 that enable the user 402 to provide inputs. The controller 406 may communicate with the HMD 404 or a separate computing unit 408 via a wireless or wired connection. The controller 406 may have any number of buttons or other mechanical input mechanisms. In addition, the controller 406 may have an IMU so that the position of the controller 406 may be tracked. The controller 406 may further be tracked based on predetermined patterns on the controller. For example, the controller 406 may have several infrared LEDs or other known observable features that collectively form a predetermined pattern. Using a sensor or camera, the system 400 may be able to capture an image of the predetermined pattern on the controller. Based on the observed orientation of those patterns, the system may compute the controller's position and orientation relative to the sensor or camera.

The artificial reality system 400 may further include a computer unit 408. The computer unit may be a stand-alone unit that is physically separate from the HMD 404 or it may be integrated with the HMD 404. In embodiments where the computer 408 is a separate unit, it may be communicatively coupled to the HMD 404 via a wireless or wired link. The computer 408 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 400 depends on the capabilities of its computer unit 408.

Figure 5:
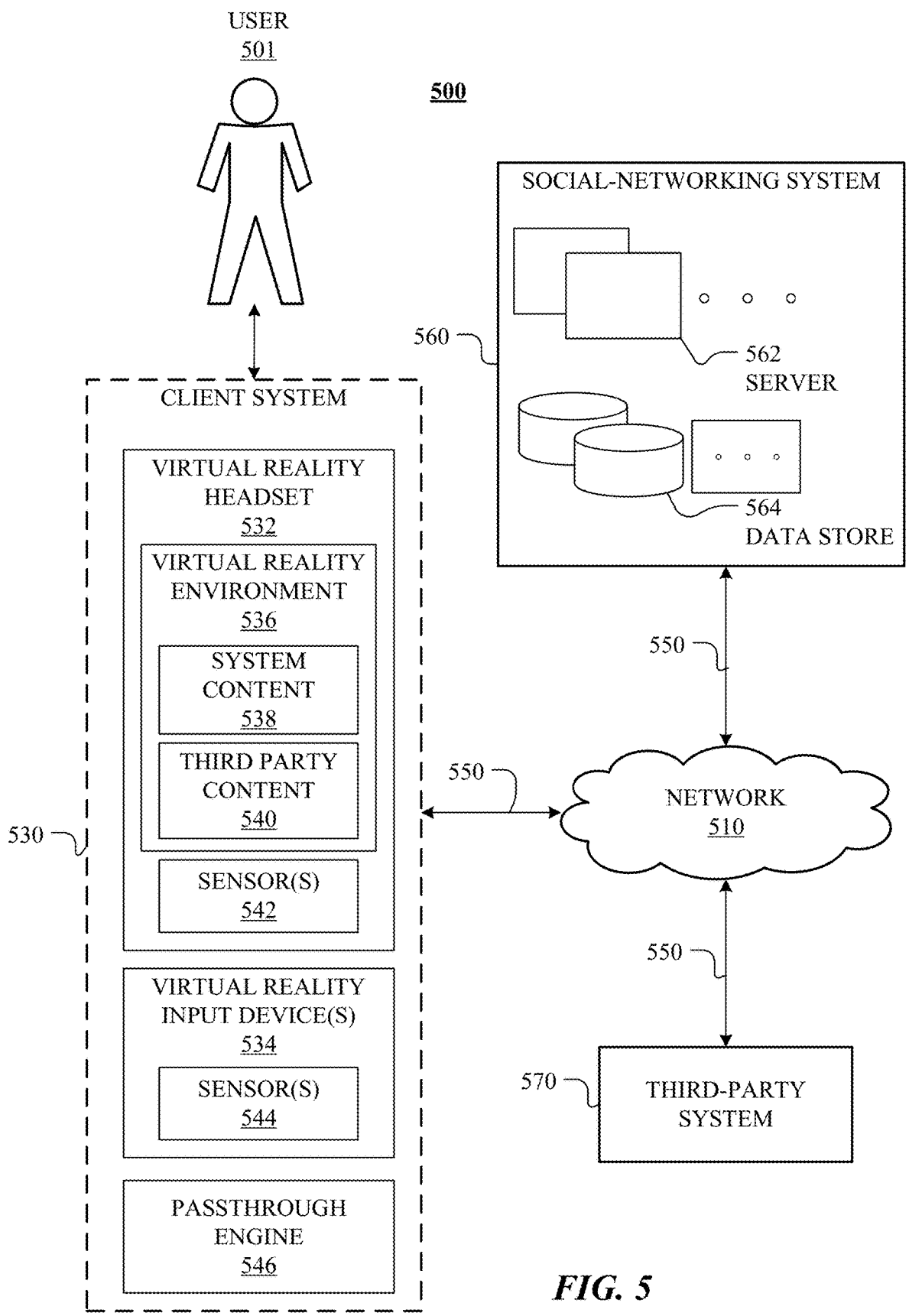
FIG. 5 illustrates an example network environment associated with an artificial reality system.

FIG. 5 illustrates an example network environment 500 associated with an artificial reality system. Although FIG. 5 may be illustrated with a virtual reality system, this example network environment 500 may include one or more other artificial reality systems, such as mixed reality systems, augmented reality systems, etc. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example and not by way of limitation, two or more of a user 501, a client system 530, a social-networking system 560, and a third-party system 570 may be connected to each other directly, bypassing a network 510. As another example, two or more of a client system 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple users 501, client systems 530, social-networking systems 560, third-party systems 570, and networks 510.

This disclosure contemplates any suitable network 510. As an example and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510.

Links 550 may connect a client system 530, a social-networking system 560, and a third-party system 570 to a communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In particular embodiments, a client system 530 may be an electronic device including hardware, software, or embedded logic components or a combination of two or more such components and capable of carrying out the appropriate functionalities implemented or supported by a client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality or mixed reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment or a mixed reality environment for a user to interact with content.

In particular embodiments, a client system 530 may include a virtual reality (or augmented reality or mixed reality) headset 532, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system 530 may use data from the sensor(s) 542 to determine velocity, orientation, and gravitation forces with respect to the headset. Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

In particular embodiments, client system 530 (e.g., an HMD) may include a passthrough engine 546 to provide the passthrough feature described herein, and may have one or more add-ons, plug-ins, or other extensions. A user at client system 530 may connect to a particular server (such as server 562, or a server associated with a third-party system 570). The server may accept the request and communicate with the client system 530.

Third-party content 540 may include a web browser and may have one or more add-ons, plug-ins, or other extensions. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation combinations of markup language and scripts, and the like. Herein, reference to a web interface encompasses one or more corresponding source files (which a browser may use to render the web interface) and vice versa, where appropriate.

In particular embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In particular embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, the social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, the social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In particular embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In particular embodiments, the social-networking system 560 may provide users with the ability to take actions on various types of items or objects, supported by the social-networking system 560. As an example and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In particular embodiments, the social-networking system 560 may be capable of linking a variety of entities. As an example and not by way of limitation, the social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In particular embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 560 also includes user-generated content objects, which may enhance a user's interactions with the social-networking system 560. User-generated content may include anything a user can add, upload, send, or "post" to the social-networking system 560. As an example and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream.

In particular embodiments, the social-networking system 560 may include a variety of servers, sub-systems, programs, modules, logs, and data stores. In particular embodiments, the social-networking system 560 may include one or more of the following: a web server, action logger, API-request server, relevance-and-ranking engine, content-object classifier, notification controller, action third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof. In particular embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
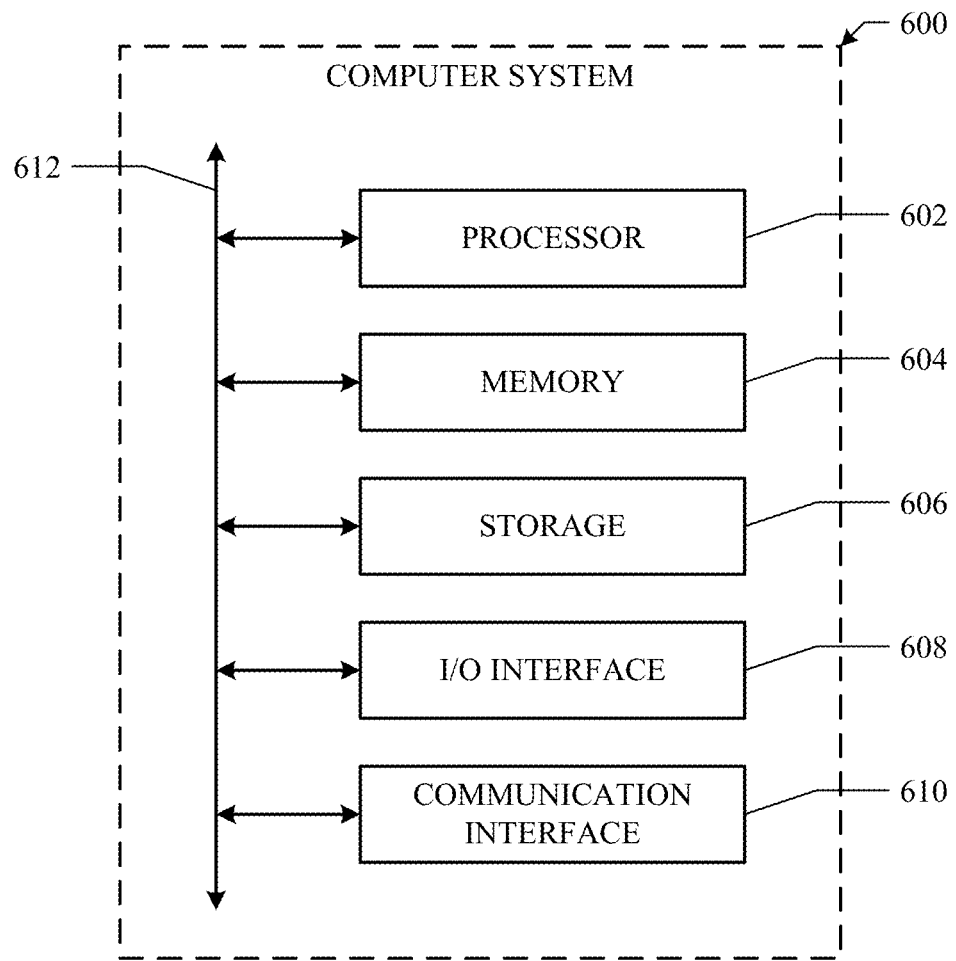
FIG. 6 illustrates an example computer system.

FIG. 6 illustrates an example computer system 600. In particular embodiments, one or more computer systems 600 perform one or more steps of one or more processes, algorithms, techniques, or methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving an image comprising one or more virtual elements associated with a virtual environment and one or more real-world elements associated with a real-world environment;
determining, using one or more image analysis techniques, a first metric indicative of a measure of clutter in the virtual environment based on the one or more virtual elements and a second metric indicative of the measure of clutter in the real-world environment based on the one or more real-world elements;
determining a plurality of gaze features associated with a user based on a user activity with respect to the image comprising the one or more virtual elements and the one or more real-world elements;
predicting, using a machine learning model, a reaction time of the user in performing the user activity based on the plurality of gaze features;
determining a third metric indicative of the measure of clutter in the image based on predicted reaction time;
computing an overall clutter metric based on the first metric determined based on the one or more virtual elements, the second metric determined based on the one or more real-world elements, and the third metric determined based on the predicted reaction time; and
performing one or more actions to manage the clutter in the image based on the overall clutter metric.

2. The method of claim 1, further comprising training the machine learning model, wherein training the machine learning model comprises:
accessing a plurality of training samples obtained based on conducting a plurality of user trials or studies in different clutter scenarios, wherein each training sample corresponding to a user trial comprises gaze features of a particular user observed for a specific duration during which the particular user performs an assigned task in a specific clutter scenario;

predicting, using the machine learning model, reaction times of users in the plurality of user trials based on the gaze features included in the plurality of training samples;

comparing the predicted reaction times with ground-truth reaction times; and updating the machine learning model based on comparison.

3. The method of claim 1, further comprising:
comparing the overall clutter metric to a predetermined threshold; and
determining that the overall clutter metric is above the predetermined threshold,
wherein the one or more actions to manage the clutter are performed in response to determining that the overall clutter metric is above the predetermined threshold.

4. The method of claim 1, wherein the one or more actions to manage the clutter comprise:
removing the one or more virtual elements from the image;
modifying information associated with the one or more virtual elements;
changing a layout or position of the one or more virtual elements in the image; or
adjusting a size of the one or more virtual elements.

5. The method of claim 1, wherein computing the overall clutter metric comprises:
taking a weighted average of the first metric, the second metric, and the third metric according to weights assigned for each of the first, second, and third metrics.

6. The method of claim 1, wherein the plurality of gaze features comprises:
gaze or saccade velocity;
saccade probability;
saccade altitude;
fixation point;
fixation duration;
saccade duration;
length of saccade; or
an angular velocity of saccade.

7. The method of claim 1, wherein the user activity comprises:
the user searching for a particular virtual element among the one or more virtual elements and the one or more real-world elements in the image.

8. The method of claim 1, further comprising:
decomposing the image into a virtual layer comprising the one or more virtual elements associated with the virtual environment and a real-world layer comprising the one or more real-world elements associated with the real-world environment, wherein:
the first metric indicative of the measure of clutter in the virtual environment is determined by executing the one or more image analysis techniques on the virtual layer; and
the second metric indicative of the measure of clutter in the real-world environment is determined by executing the one or more image analysis techniques on the real-world layer.

9. The method of claim 1, wherein the one or more image analysis techniques comprise:
a feature congestion technique;
a subband entropy technique; or
an edge density technique.

10. The method of claim 1, wherein the image is captured by an artificial reality system.

11. The method of claim 10, wherein:
the one or more virtual elements comprise applications installed on the artificial reality system; and
the one or more real-world elements comprise physical objects present in the real-world environment.

12. The method of claim 1, wherein the one or more virtual elements are overlaid on top of the one or more real-world elements.

13. One or more computer-readable non-transitory non-volatile storage media embodying software that is operable when executed to:
receive an image comprising one or more virtual elements associated with a virtual environment and one or more real-world elements associated with a real-world environment;
determine, using one or more image analysis techniques, a first metric indicative of a measure of clutter in the virtual environment based on the one or more virtual elements and a second metric indicative of the measure of clutter in the real-world environment based on the one or more real-world elements;
determine a plurality of gaze features associated with a user based on a user activity with respect to the image comprising the one or more virtual elements and the one or more real-world elements;
predict, using a machine learning model, a reaction time of the user in performing the user activity based on the plurality of gaze features;
determine a third metric indicative of the measure of clutter in the image based on predicted reaction time;
compute an overall clutter metric based on the first metric determined based on the one or more virtual elements, the second metric determined based on the one or more real-world elements, and the third metric determined based on the predicted reaction time; and
perform one or more actions to manage the clutter in the image based on the overall clutter metric.

14. The non-transitory, non-volatile media of claim 13, wherein the software is further operable when executed to train the machine learning model, wherein training the machine learning model comprises:
accessing a plurality of training samples obtained based on conducting a plurality of user trials or studies in different clutter scenarios, wherein each training sample corresponding to a user trial comprises gaze features of a particular user observed for a specific duration during which the particular user performs an assigned task in a specific clutter scenario;
predicting, using the machine learning model, reaction times of users in the plurality of user trials based on the gaze features included in the plurality of training samples;
comparing the predicted reaction times with ground-truth reaction times; and
updating the machine learning model based on comparison.

15. The non-transitory, non-volatile media of claim 13, wherein the software is further operable when executed to:
compare the overall clutter metric to a predetermined threshold; and
determine that the overall clutter metric is above the predetermined threshold;
wherein the one or more actions to manage the clutter are performed in response to determining that the overall clutter metric is above the predetermined threshold.

16. The non-transitory, non-volatile media of claim 13, wherein the one or more actions to manage the clutter comprise:
- removing the one or more virtual elements from the image;
- modifying information associated with the one or more virtual elements;
- changing a layout or position of the one or more virtual elements in the image; or
- adjusting a size of the one or more virtual elements.

17. A system comprising:
- one or more processors; and
- one or more computer-readable non-transitory non-volatile storage media coupled to one or more of the processors and comprising instructions operable when executed by one or more of the processors to cause the system to:
- receive an image comprising one or more virtual elements associated with a virtual environment and one or more real-world elements associated with a real-world environment;
- determine, using one or more image analysis techniques, a first metric indicative of a measure of clutter in the virtual environment based on the one or more virtual elements and a second metric indicative of the measure of clutter in the real-world environment based on the one or more real-world elements;
- determine a plurality of gaze features associated with a user based on a user activity with respect to the image comprising the one or more virtual elements and the one or more real-world elements;
- predict, using a machine learning model, a reaction time of the user in performing the user activity based on the plurality of gaze features;
- determine a third metric indicative of the measure of clutter in the image based on predicted reaction time;
- compute an overall clutter metric based on the first metric determined based on the one or more virtual elements, the second metric determined based on the one or more real-world elements, and the third metric determined based on the predicted reaction time; and
- perform one or more actions to manage the clutter in the image based on the overall clutter metric.

18. The system of claim 17, wherein the one or more processors are further operable when executing the instructions to cause the system to train the machine learning model, wherein training the machine learning model comprises:
- accessing a plurality of training samples obtained based on conducting a plurality of user trials or studies in different clutter scenarios, wherein each training sample corresponding to a user trial comprises gaze features of a particular user observed for a specific duration during which the particular user performs an assigned task in a specific clutter scenario;
- predicting, using the machine learning model, reaction times of users in the plurality of user trials based on the gaze features included in the plurality of training samples;
- comparing the predicted reaction times with ground-truth reaction times; and
- updating the machine learning model based on comparison.

19. The system of claim 17, wherein the one or more processors are further operable when executing the instructions to cause the system to:
- compare the overall clutter metric to a predetermined threshold; and
- determine that the overall clutter metric is above the predetermined threshold,
- wherein the one or more actions to manage the clutter are performed in response to determining that the overall clutter metric is above the predetermined threshold.

20. The system of claim 17, wherein the one or more actions to manage the clutter comprise:
- removing the one or more virtual elements from the image;
- modifying information associated with the one or more virtual elements;
- changing a layout or position of the one or more virtual elements in the image; or
- adjusting a size of the one or more virtual elements.

* * * * *